(12) United States Patent
Seo et al.

(10) Patent No.: US 7,892,135 B2
(45) Date of Patent: Feb. 22, 2011

(54) POWER TRAIN OF AN AUTOMATIC TRANSMISSION FOR VEHICLES

(75) Inventors: Kang Soo Seo, Suwon (KR); Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 365 days.

(21) Appl. No.: 12/197,427

(22) Filed: Aug. 25, 2008

(65) Prior Publication Data

US 2009/0156352 A1    Jun. 18, 2009

(30) Foreign Application Priority Data

Dec. 14, 2007    (KR) ............... 10-2007-0131642

(51) Int. Cl.
*F16H 3/62* (2006.01)
(52) U.S. Cl. .................................. 475/275
(58) Field of Classification Search ............ None
See application file for complete search history.

(56) References Cited

U.S. PATENT DOCUMENTS

| | | | | |
|---|---|---|---|---|
| 7,118,509 B2 * | 10/2006 | Tabata et al. | ........... | 475/276 |
| 7,402,119 B2 * | 7/2008 | Kamada et al. | ........... | 475/282 |
| 7,766,782 B2 * | 8/2010 | Wittkopp et al. | ........... | 475/275 |
| 2004/0242366 A1 * | 12/2004 | Tabata et al. | ........... | 475/275 |
| 2009/0291800 A1 * | 11/2009 | Jang et al. | ........... | 475/275 |
| 2009/0298637 A1 * | 12/2009 | Kim | ........... | 475/275 |
| 2009/0298639 A1 * | 12/2009 | Kim | ........... | 475/275 |
| 2009/0305836 A1 * | 12/2009 | Jang et al. | ........... | 475/275 |
| 2009/0312139 A1 * | 12/2009 | Jang et al. | ........... | 475/275 |
| 2009/0312140 A1 * | 12/2009 | Jang et al. | ........... | 475/275 |
| 2009/0312141 A1 * | 12/2009 | Jang et al. | ........... | 475/275 |

* cited by examiner

*Primary Examiner*—Dirk Wright
(74) *Attorney, Agent, or Firm*—Morgan, Lewis & Bockius LLP

(57) ABSTRACT

An eight-speed power train of a vehicle automatic transmission includes one simple double pinion planetary gear set, one compound planetary gear set, four clutches, and two brakes. The compound planetary gear set includes a simple single pinion planetary gear set, and a double pinion planetary gear set.

14 Claims, 3 Drawing Sheets

FIG. 2

| 변속단 | C1 | C2 | C3 | C4 | B1 | B2 | F1 |
|---|---|---|---|---|---|---|---|
| D1 | ● | | | | ○ | | ● |
| D2 | ● | | | | | ● | |
| D3 | ● | ● | | | | | |
| D4 | ● | | | ● | | | |
| D5 | ● | | ● | | | | |
| D6 | | | ● | ● | | | |
| D7 | | ● | ● | | | | |
| D8 | | | ● | | | ● | |
| REV | | ● | | | ● | | |

POWER TRAIN OF AN AUTOMATIC TRANSMISSION FOR VEHICLES

CROSS-REFERENCE TO RELATED APPLICATION

This application claims priority to, and the benefit of, Korean Patent Application No. 10-2007-0131642, filed in the Korean Intellectual Property Office on Dec. 14, 2007, the entire contents of which are incorporated herein by reference.

BACKGROUND OF THE INVENTION (a) Field of the Invention

The present invention relates to an eight-speed power train of a vehicle automatic transmission that includes one simple planetary gear set, one compound planetary gear set, four clutches, and two brakes.

(b) Description of the Related Art

A variety of power trains and hydraulic control systems thereof are available. Four- and five-speed automatic transmissions are the most common. Six-, seven-, and eight-speed transmissions are being made available for superior performance and fuel mileage. The number of gear sets and frictional elements should be as low as possible, to minimize cost and weight, and maximize stability.

The above information disclosed in this Background section is only for enhancement of understanding of the background of the invention and therefore it may contain information that does not form the prior art that is already known in this country to a person of ordinary skill in the art.

SUMMARY OF THE INVENTION

A power train of an automatic transmission for vehicles. A first, double pinion, planetary gear set includes a first sun gear connected to a transmission housing so as to be operated as a fixed member, a first ring gear forming a first intermediate output pathway where a reduced rotational speed is always output, and a first planet carrier connected to an input shaft so as to form an input pathway and forming a second intermediate output pathway where an input rotational speed is directly output. A second planetary gear set includes a simple single pinion planetary gear set, including a second sun gear, a second planet carrier, and a second ring gear; and a double pinion planetary gear set including a third sun gear, a third planet carrier, and a third ring gear. The third sun gear is directly connected to the first ring gear so as to form a first intermediate input pathway. The second ring gear is connected to an output shaft so as to form a final output pathway. The second planet carrier and the third ring gear are selectively connected to the input shaft so as to form a variable input pathway and also selectively connected to the transmission housing so as to be operated as a variable fixed member. The second sun gear and the third planet carrier are selectively connected respectively to the first ring gear and the first planet carrier so as to form a second intermediate input pathway and also selectively connected to the transmission housing so as to be operated as a variable fixed member. A plurality of frictional members selectively connects the gears and planet carriers with each other or with the transmission housing.

The plurality of frictional members may include a first clutch coupling or decoupling the second sun gear and the third planet carrier to the first rig gear and the first planet carrier, respectively; a second clutch disposed between the first intermediate output pathway and the second intermediate input pathway; a third clutch disposed on the variable input pathway; a fourth clutch disposed between the second intermediate output pathway and the second intermediate input pathway; a first brake and a one-way clutch disposed in parallel between the second planet carrier and the third ring gear on one side, and the transmission housing on another side; and a second brake disposed between the second sun gear and the transmission housing.

The first clutch and the one-way clutch may be operated at a first forward speed. The first clutch and the second brake may be operated at a second forward speed. The first and second clutches may be operated at a third forward speed. The first and fourth clutches may be operated at a fourth forward speed. The first and third clutches may be operated at a fifth forward speed. The third and fourth clutches may be operated at a sixth forward speed. The second and third clutches may be operated at a seventh forward speed. The third clutch and the second brake may be operated at an eighth forward speed. The second clutch and the first brake may be operated at a reverse speed.

The first clutch may be disposed between the first and second planetary gear sets. The first and second brakes and the one-way clutch may be disposed at an exterior side of the first clutch. The second and fourth clutches may be disposed at an exterior side of the first planetary gear set. The third clutch may be disposed behind the second planetary gear set.

In a state that torque of the first intermediate output pathway in the first planetary gear set is input through the first intermediate input pathway of the second planetary gear set, the second planet carrier and the third ring gear may be operated as the fixed member and the first forward speed may be output through the second ring gear.

In a state that torque of the first intermediate output pathway in the first planetary gear set is input through the first intermediate input pathway of the second planetary gear set, the second sun gear and the third planet carrier may be operated as the fixed member and the second forward speed may be output through the second ring gear.

In a state that torque of the first intermediate output pathway in the first planetary gear set is input through the first and second intermediate input pathways of the second planetary gear set, the third forward speed may be output through the second ring gear.

In a state that torque of the first intermediate output pathway in the first planetary gear set is input through the first intermediate input pathway of the second planetary gear set, torque of the second intermediate output pathway in the first planetary gear set may be input through the second intermediate input pathway of the second planetary gear set and the fourth forward speed may be output through the second ring gear.

In a state that torque of the first intermediate output pathway in the first planetary gear set is input through the first intermediate input pathway of the second planetary gear set, torque of the input shaft may be input through the variable input pathway and the fourth forward speed may be output through the second ring gear.

In a state that torque of the first intermediate output pathway in the first planetary gear set is input through the first intermediate input pathway of the second planetary gear set, torque of the input shaft may be input through the variable input pathway and the fifth forward speed may be output through the second ring gear.

In a state that torque of the second intermediate output pathway in the first planetary gear set is input through the second intermediate input pathway of the second planetary gear set, torque of the input shaft may be input through the variable input pathway and the sixth forward speed may be output through the second ring gear.

In a state that torque of the first intermediate output pathway in the first planetary gear set is input through the second intermediate input pathway of the second planetary gear set, torque of the input shaft may be input through the variable input pathway and the seventh forward speed may be output through the second ring gear.

In a state that torque of the input shaft is input through the variable input pathway of the second planetary gear set, the second sun gear and the third planet carrier may be operated as the fixed member and the eighth forward speed may be output through the second ring gear.

In a state that torque of the first intermediate output pathway in the first planetary gear set is input through the second intermediate input pathway of the second planetary gear set, the second planet carrier and the third ring gear may be operated as the fixed member and the reverse speed may be output through the second ring gear.

BRIEF DESCRIPTION OF THE DRAWINGS

FIG. 2 is an operational chart of the power train of FIG. 1.

DETAILED DESCRIPTION OF PREFERRED EMBODIMENTS

Hereinafter, an exemplary embodiment of the present invention will be described in detail with reference to the accompanying drawings.

Figure 1:
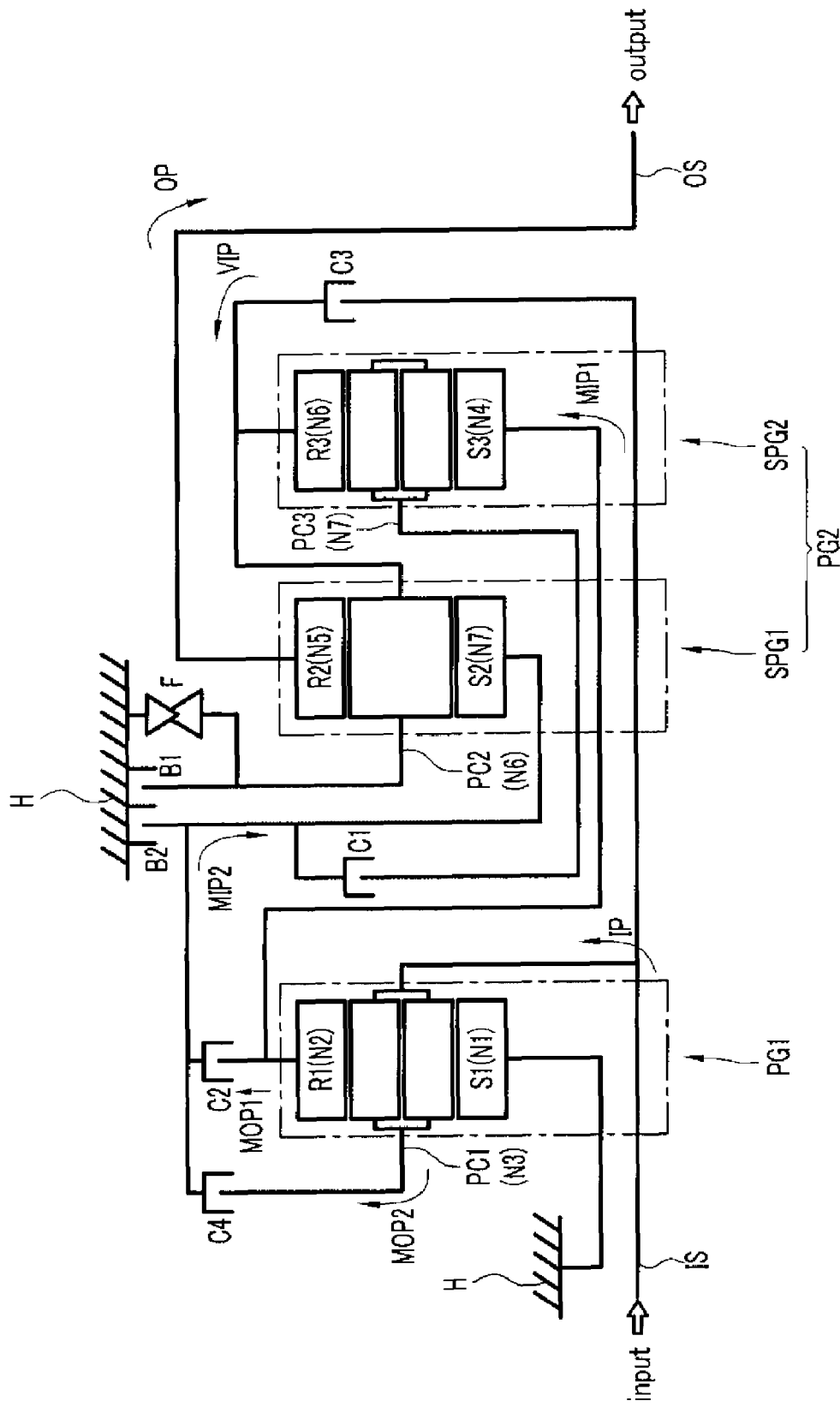
FIG. 1 is a schematic diagram of a power train according to an exemplary embodiment.

As shown in FIG. 1, a power train according to an exemplary embodiment of the present invention includes first and second planetary gear sets PG1 and PG2 disposed coaxially; four clutches C1, C2, C3, and C4; and two brakes B1 and B2.

The first planetary gear set PG1 changes torque input from an input shaft IS into a reduced rotational speed and transmits the same to the second planetary gear set PG2. The second planetary gear set PG2 changes torque directly or indirectly transmitted from the first planetary gear set PG1 and torque selectively transmitted from the input shaft IS into eight forward speeds and one reverse speed and outputs the same through an output shaft OS.

The first planetary gear set PG1 is thus disposed near the engine, and the second planetary gear set PG2 is disposed behind the first planetary gear set PG1.

The input shaft IS is an input member, such as a turbine shaft of a torque converter. The torque transmitted from a crankshaft of the engine is supplied to the input shaft IS through the torque converter. The output shaft OS is an output member and the torque of the output shaft OS is transmitted to a differential apparatus through an output gear (not shown) and drives a driving wheel.

The first planetary gear set PG1 is a double pinion planetary gear set, and includes a first rotational member N1, such as a first sun gear S1; a second rotational member N2, such as a first ring gear R1; and a third rotational member N3, such as a first planet carrier PC1. The first rotational member N1 is directly connected to a transmission housing H so as to be always operated as a fixed member. The second rotational member N2 forms a first intermediate output pathway MOP1 where a reduced rotational speed is always output. The third rotational member N3 is directly connected to the input shaft IS and forms an input pathway IP so as to be always operated as an input member, and forms a second intermediate output pathway MOP2 where an input rotational speed is directly output.

The second planetary gear set PG2 includes first and second simple planetary gear sets SPG1 and SPG2 and includes fourth, fifth, sixth, and seventh rotational members N4, N5, N6, and N7. The first simple planetary gear set SPG1 may be a single pinion planetary gear set and the second simple planetary gear set SPG2 may be a double pinion planetary gear set.

The simple planetary gear sets SPG1 and SPG2 are combined by directly connecting the second carrier PC2 with the third ring gear R3 and selectively connecting the second sun gear S2 with the third planet carrier PC3 through the first clutch C1.

Accordingly, the fourth rotational member N4 includes the third sun gear S3, the fifth rotational member N5 includes the second ring gear R2, the sixth rotational member N6 includes the second planet carrier PC2 and the third ring gear R3, and the seventh rotational member N7 includes the second sun gear S2 and the third plant carrier PC3.

The fourth rotational member N4 is directly connected to the second rotational member N2 forming the first intermediate output pathway MOP1 in the first planetary gear set PG1 so as to form a first intermediate input pathway MIP1 where the reduced rotational speed is always input from the first planetary gear set PG1.

The fifth rotational member N5 is directly connected to the output shaft OS so as to be always operated as an output member.

The sixth rotational member N6 is selectively connected to the input shaft IS by interposing the third clutch C3 so as to form a variable input pathway VIP and be operated as a selective input member, and is selectively connected to a transmission housing H by the first brake B1 and the one-way clutch F disposed in parallel with each other so as to be operated as a variable fixed member.

The seventh rotational member N7 is formed by selectively connecting the second sun gear S2 with the third planet carrier PC3 through the first clutch C1. The second sun gear S2 is selectively connected to the second rotational member N2 of the first planetary gear set PG1 by the second clutch C2 and is selectively connected to the third rotational member N3 (the first planet carrier PC1) of the first planetary gear set PG1 by interposing the fourth clutch C4 so as to form a second intermediate input pathway MIP2 and be operated as a selective input member. The second sun gear S2 is selectively connected to the transmission housing H by the second brake B2 so as to be operated as a variable fixed member.

The third clutch C3 is disposed between the third ring gear R3 and the input shaft IS, and the one-way clutch F and the first brake B1 are disposed between the second planet carrier PC2 and the transmission housing H. The first clutch C1 is disposed between the second sun gear S2 and the third planet carrier PC3. The second clutch C2 is disposed between the second rotational member N2 and the second sun gear S2. The fourth clutch C4 is disposed between the third rotational member N3 and the second sun gear S2. The second brake B2 is disposed between the second clutch C2 and the second sun gear S2.

The clutches C1, C2, C3, and C4 and the brakes B1 and B2 may include a plurality of disks that are engaged by frictional force applied by hydraulic pressure.

The first clutch C1 is disposed between the first and second planetary gear sets PG1 and PG2, and the first and second brakes B1 and B2 and the one-way clutch F are disposed at an exterior side of the first clutch C1.

In addition, the second and fourth clutches C2 and C4 are disposed at an exterior side of the first planetary gear set PG1, and the third clutch C3 is disposed at a rear portion of the second planetary gear set PG2. Thus, the frictional members are dispersed, providing stability and allowing ease and design freedom in positioning the hydraulic lines necessary to supply hydraulic pressure to the frictional members.

As shown in FIG. 2, each speed is achieved by operation of two frictional members.

That is, the first clutch C1 and the one-way clutch F or the first brake B1 are operated at a first forward speed, the first clutch C1 and the second brake B2 are operated at a second forward speed, the first and second clutches C1 and C2 are operated at a third forward speed, the first and fourth clutches C1 and C4 are operated at a fourth forward speed, the first and third clutches C1 and C3 are operated at a fifth forward speed, the third and fourth clutches C3 and C4 are operated at a sixth forward speed, the second and third clutches C2 and C3 are operated at a seventh forward speed, the third clutch C3 and the second brake B2 are operated at an eighth forward speed, and the second clutch C2 and the first brake B1 are operated at a reverse speed.

Figure 3:
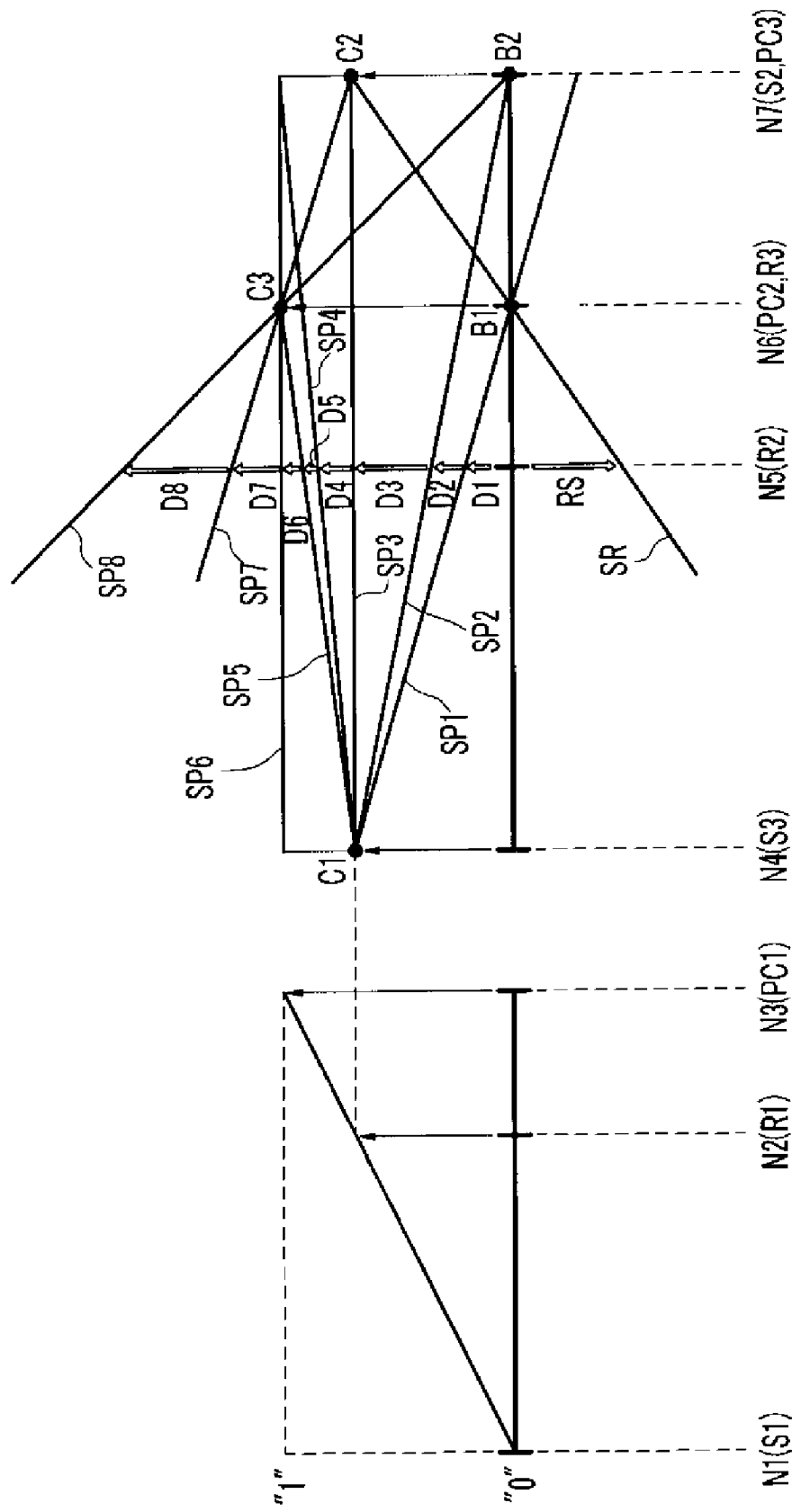
FIG. 3 is a lever diagram of the power train of FIG. 1.

In FIG. 3, the lower horizontal line represents zero rotational speed ("0"), and the upper horizontal line represents a rotational speed equal to that of the input shaft IS ("1").

The three vertical lines of the first planetary gear set PG1 respectively represent the first rotational member N1, the second rotational member N2, and the third rotational member N3 sequentially from the left in the drawing, and the distances between them are determined according to the gear ratio between the first rotational member N1 and the second rotational member N2.

In addition, the four vertical lines of the second planetary gear set PG2 respectively represent the fourth rotational member N4, the fifth rotational member N5, the sixth rotational member N6, and the seventh rotational member N7 sequentially from the left in the drawing, and the distances between them are determined according to the gear ratios between the first and second simple planetary gear sets SPG1 and SGP2. The lever diagram is well known to a person of an ordinary skill in the art, and accordingly detailed descriptions will be omitted.

Hereinafter, shifting processes of an exemplary power train will be described in detail.

First Forward Speed

As shown in FIG. 2, the first clutch C1 and the one-way clutch F or the first brake B1 are operated at the first forward speed D1.

In this case, as shown in FIG. 3, in a state that torque is input to the third rotational member N3 of the first planetary gear set PG1, the first rotational member N1 is operated as the fixed member and the reduced rotational speed is output to the first intermediate output pathway MOP1 through the second rotational member N2.

The reduced rotational speed of the second rotational member N2 is transmitted to the fourth rotational member N4 through the first intermediate input pathway MIP1.

In a state that the reduced rotational speed is input to the fourth rotational member N4 of the second planetary gear set PG2, the sixth rotational member N6 is operated as the fixed member by operation of the one-way clutch F. Therefore, a first shift line SP1 connecting the fourth rotational member N4 with the sixth rotational member N6 is formed and the first forward speed D1 is output to the final output pathway OP through the fifth rotational member N5 of the output member.

Second Forward Speed

In the first forward speed D1, the one-way clutch F1 (or the first brake B1) is released and the second brake B2 is operated to achieve the second forward speed D2.

In this case, in a state that the same torque is input as at the first forward speed D1, the seventh rotational member N7 is operated as the fixed member by operation of the second brake B2. Therefore, a second shift line SP2 connecting the fourth rotational member N4 with the sixth rotational member N6 is formed and the second forward speed D2 is output to the final output pathway OP through the fifth rotational member N5 of the output member.

Third Forward Speed

In the second forward speed D2, the second brake B2 is released and the second clutch C2 is operated to achieve the third forward speed D3.

In this case, the reduced rotational speed of the second rotational member N2 is directly transmitted to the fourth rotational member N4 through the first intermediate input pathway MOP1 and is transmitted to the seventh rotational member N7 through the second intermediate input pathway MIP2 by operations of the second clutch C2 and the first clutch C1. Since all rotational members of the second planetary gear set PG2 enter a lock state, a third shift line SP3 connecting the fourth rotational member N4 with the seventh rotational member N7 is formed and the third forward speed D3 is output to the final output pathway OP through the fifth rotational member N5 of the output member.

Fourth Forward Speed

In the third forward speed D3, the second clutch C2 is released and the fourth clutch C4 is operated to achieve the fourth forward speed D4.

In this case, the reduced rotational speed of the second rotational member N2 is directly transmitted to the fourth rotational member N4 through the first intermediate input pathway MOP1, and the input rotational speed is transmitted to the seventh rotational member N7 through the second intermediate input pathway MIP2 by operation of the fourth clutch C4. Therefore, a fourth shift line SP4 connecting the fourth rotational member N4 with the seventh rotational member N7 is formed and the fourth forward speed D4 is output to the final output pathway OP through the fifth rotational member N5 of the output member.

Fifth Forward Speed

In the fourth forward speed D4, the fourth clutch C4 is released and the third clutch C3 is operated to achieve the fifth forward speed D5.

In this case, the reduced rotational speed of the second rotational member N2 is transmitted to the fourth rotational member N4 through the first intermediate input pathway MIP1, and the rotational speed of the input shaft IS is transmitted to the sixth rotational member N6 through the variable input pathway VIP by operation of the third clutch C3. Therefore, a fifth shift line SP5 connecting the fourth rotational member N4 with the sixth rotational member N6 is formed and the fifth forward speed D5 is output to the final output pathway OP through the fifth rotational member N5 of the output member.

Sixth Forward Speed

In the fifth forward speed D5, the first clutch C1 is released and the fourth clutch C4 is operated to achieve the sixth forward speed D6.

In this case, the rotational speed of the input shaft IS is transmitted to the sixth rotational member N6 through the variable input pathway VIP by operation of the third clutch C3 and is transmitted to the seventh rotational member N4 through the first intermediate output pathway MOP1 of the first planetary gear set PG1 and the second intermediate input pathway MIP2 by operation of the fourth clutch C4. Since all rotational members of the second planetary gear set PG2 enter the lock state, a sixth shift line SP6 connecting the sixth rotational member N6 with the seventh rotational member N7 is formed and the sixth forward speed D6 is output to the final output pathway OP through the fifth rotational member N5 of the output member.

Seventh Forward Speed

In the sixth forward speed D6, the fourth clutch C4 is released and the second clutch C2 is operated to achieve the seventh forward speed D7.

In this case, in a state that the rotational speed of the input shaft IS is transmitted to the sixth rotational member N6 of the second planetary gear set PG2 through the variable input pathway VIP by operation of the third clutch C3, the reduced rotational speed of the first planetary gear set PG1 is transmitted to the seventh rotational member N7 through the second intermediate input pathway MIP2 by operation of the second clutch C2. Therefore, a seventh shift line SP7 connecting the sixth rotational member N6 with the seventh rotational member N7 is formed and the seventh forward speed D7 is output to the final output pathway OP through the fifth rotational member N5 of the output member.

Eighth Forward Speed

In the seventh forward speed D7, the second clutch C2 is released and the second brake B2 is operated to achieve the eighth forward speed D8.

In this case, in a state that the rotational speed of the input shaft IS is transmitted to the sixth rotational member N6 of the second planetary gear set PG2 through the variable input pathway VIP by operation of the third clutch C3, the seventh rotational member N7 is operated as the fixed member by operation of the second brake B2. Therefore, an eighth shift line SP8 connecting the sixth rotational member N6 with the seventh rotational member N7 is formed and the eighth forward speed D8 is output to the final output pathway OP through the fifth rotational member N5 of the output member.

Reverse Speed

The second clutch C2 and the first brake B1 are operated to achieve the reverse speed REV.

In this case, in a state that the torque is input to the third rotational member N3 of the first planetary gear set PG1, the first rotational member NI is operated as the fixed member. Therefore, the reduced rotational speed is output to the first intermediate output pathway MOP1 through the second rotational member N2.

In addition, in a state that the reduced rotational speed of the second rotational member N2 is transmitted to the seventh rotational member N7 of the second planetary gear set PG2 through the second intermediate input pathway MIP2 by operation of the second clutch C2, the sixth rotational member N6 is operated as the fixed member by an operation of the first brake B1. Therefore, a reverse shift line SR is formed and the reverse speed REV is output to the final output pathway OP through the fifth rotational member N5 of the output member.

Since the first clutch C1 is not operated at the sixth, seventh, and eighth forward speeds D6, D7, and D8 or the reverse speed REV, the second sun gear S2 and the third planet carrier PC3 do not interfere with each other. Therefore, the torque is input only to the second sun gear S2 at the sixth and seventh forward speed D6 and D7, and the second sun gear S2 is only operated as the fixed member at the eighth forward speed D8.

As described above, the first planetary gear set PG1 is a simple planetary gear set having three rotational members. The first rotational member N1 is operated as the fixed member, the second rotational member N2 is operated as the intermediate output member, and the third rotational member N3 is operated as the input member and the selective output member.

In addition, the second planetary gear set PG2 includes first and second simple planetary gear sets SPG1 and SPG2 having three rotational members respectively, and includes the fourth, fifth, sixth, and seventh rotational members N4, N5, N6, and N7.

The fourth rotational member N4 is directly connected to the second rotational member N2 of the first planetary gear set PG1 and is always input an intermediate input, but the fourth rotational member N4 is operated as the intermediate input member at the first, second, third, fourth, and fifth forward speeds D1, D2, D3, D4, and D5.

The fifth rotational member N5 is connected to the output shaft OS and is operated as the output member.

The sixth rotational member N6 is selectively connected to the input shaft IS and the transmission housing H such that the sixth rotational member N6 is operated as the input member at the sixth, seventh, and eighth forward speeds D6, D7, and D8 and is operated as the fixed member at the first forward speed D1 and the reverse speed REV.

The seventh rotational member N7 is formed by selectively connecting two rotational members such that the two rotational members are coupled with or decoupled from each other. The seventh rotational member N7 is selectively connected to the second and third rotational members N2 and N3 and is selectively connected to the transmission housing H such that the seventh rotational member N7 is operated as the fixed member at the second and eighth forward speeds D2 and D8 and is operated as the input member at the third, fourth, sixth, and seventh forward speeds D3, D4, D6, and D7 and the reverse speed REV.

As shown in FIG. 3, in a state that the first clutch C1 is operated, the fourth rotational member N4 is operated as the input member and the sixth rotational member N6 is operated as the fixed member by an operation of the one-way clutch F. Thus, shift to the first forward speed D1 is achieved.

In the first forward speed D1, the seventh rotational member N7 is operated as the fixed member by an operation of the second brake B2. Thus, shift to the second forward speed D2 is achieved.

In the second forward speed D2, the second brake B2 is released and the second clutch C2 is operated such that the reduced rotational speed of the first planetary gear set PG1 is transmitted simultaneously to the fourth rotational member and the seventh rotational member N7. Thus, shift to the third forward speed D2 that is the same as the reduced rotational speed is achieved.

In the third forward speed D3, the second clutch C2 is released and the fourth clutch C4 is operated such that the reduced rotational speed of the first planetary gear set PG1 is transmitted to the fourth rotational member and the rotational speed of the input shaft IS is transmitted to the seventh rotational member N7. Thus, shift to the fourth forward speed D4 is achieved.

In the fourth forward speed D4, the fourth clutch C4 is released and the third clutch C3 is operated such that the reduced rotational speed is transmitted to the fourth rotational member N4 and the rotational speed of the input shaft IS is transmitted to the seventh rotational member N7. Thus, shift to the fifth forward speed D5 is achieved.

In the fifth forward speed D5, the first clutch C1 is released and the fourth clutch C4 is operated such that the rotational speed of the input shaft IS is transmitted simultaneously to the sixth rotational member N4 and the seventh rotational member N7. Thus, shift to the sixth forward speed D6 that is the same as the rotational speed of the input shaft IS is achieved.

In the sixth forward speed D6, the fourth clutch C4 is released and the second clutch C2 is operated such that the reduced rotational speed is transmitted to the seventh rotational member N7 where the second sun gear S2 is decoupled from the third planet carrier PC3 and the rotational speed of the input shaft IS is transmitted to the sixth rotational member N6. Thus, shift to the seventh forward speed D7 is achieved.

In the seventh forward speed D7, the second clutch C2 is released and the second brake B2 is operated such that the seventh rotational member N7 is changed into the fixed member. Thus, shift to the eighth forward speed D8 of a highest forward speed is achieved.

In a state that the reduced rotational speed input is transmitted to the seventh rotational member N7 by an operation of the second clutch C2, the sixth rotational member N6 is operated as the fixed member. Thus, shift to the reverse speed REV is achieved.

Since the first clutch C1 is released and the second sun gear S2 is decoupled from the third planet carrier PC3 at the sixth, seventh, and eighth forward speeds D6, D7, and D8 and the reverse speed REV, all rotational members of the second planetary gear set PG2 are not in the lock state even if the torque is input to two rotational members of the second planetary gear set PG2. Thus, shift to a target speed can be achieved.

According to the present invention, power delivery performance and fuel mileage may be improved as a consequence of achieving eight forward speeds and one reverse speed by using one simple planetary gear set, one compound planetary gear set, four clutches, and two brakes.

In addition, hydraulic lines may be simplified by the dispersed arrangement of the frictional members, and capacity of a hydraulic pump may be decreased and control efficiency of hydraulic pressure may be improved as a consequence of shift to a target speed being achieved by operating only two frictional members.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power train of an automatic transmission for vehicles, comprising:
    a first, double pinion, planetary gear set, comprising:
        a first sun gear connected to a transmission housing so as to be operated as a fixed member;
        a first ring gear forming a first intermediate output pathway where a reduced rotational speed is always output; and
        a first planet carrier connected to an input shaft so as to form an input pathway and forming a second intermediate output pathway where an input rotational speed is directly output;
    a second planetary gear set comprising:
        a simple single pinion planetary gear set, comprising a second sun gear, a second planet carrier, and a second ring gear; and
        a double pinion planetary gear set comprising a third sun gear, a third planet carrier, and a third ring gear;
    wherein the third sun gear is directly connected to the first ring gear so as to form a first intermediate input pathway, the second ring gear is connected to an output shaft so as to form a final output pathway, the second planet carrier and the third ring gear are selectively connected to the input shaft so as to form a variable input pathway and also selectively connected to the transmission housing so as to be operated as a variable fixed member, and the second sun gear and the third planet carrier are selectively connected respectively to the first ring gear and the first planet carrier so as to form a second intermediate input pathway and also selectively connected to the transmission housing so as to be operated as a variable fixed member; and
    a plurality of frictional members for selectively connecting the gears and planet carriers with each other or with the transmission housing.

2. The power train of claim 1, wherein the plurality of frictional members comprises:
    a first clutch coupling or decoupling the second sun gear and the third planet carrier to the first rig gear and the first planet carrier, respectively;
    a second clutch disposed between the first intermediate output pathway and the second intermediate input pathway;
    a third clutch disposed on the variable input pathway;
    a fourth clutch disposed between the second intermediate output pathway and the second intermediate input pathway;
    a first brake and a one-way clutch disposed in parallel between the second planet carrier and the third ring gear on one side, and the transmission housing on another side; and
    a second brake disposed between the second sun gear and the transmission housing.

3. The power train of claim 2, wherein the first clutch and the one-way clutch are operated at a first forward speed,
    the first clutch and the second brake are operated at a second forward speed,
    the first and second clutches are operated at a third forward speed,
    the first and fourth clutches are operated at a fourth forward speed,
    the first and third clutches are operated at a fifth forward speed,
    the third and fourth clutches are operated at a sixth forward speed,
    the second and third clutches are operated at a seventh forward speed,
    the third clutch and the second brake are operated at an eighth forward speed, and
    the second clutch and the first brake are operated at a reverse speed.

4. The power train of claim 2, wherein the first clutch is disposed between the first and second planetary gear sets, the first and second brakes and the one-way clutch are disposed at an exterior side of the first clutch, the second and fourth clutches are disposed at an exterior side of the first planetary gear set, and the third clutch is disposed behind the second planetary gear set.

5. The power train of claim 1, wherein, in a state that torque of the first intermediate output pathway in the first planetary gear set is input through the first intermediate input pathway of the second planetary gear set, the second planet carrier and the third ring gear are operated as the fixed member and the first forward speed is output through the second ring gear.

6. The power train of claim 1, wherein, in a state that torque of the first intermediate output pathway in the first planetary gear set is input through the first intermediate input pathway of the second planetary gear set, the second sun gear and the third planet carrier are operated as the fixed member and the second forward speed is output through the second ring gear.

7. The power train of claim 1, wherein, in a state that torque of the first intermediate output pathway in the first planetary gear set is input through the first and second intermediate input pathways of the second planetary gear set, the third forward speed is output through the second ring gear.

8. The power train of claim 1, wherein, in a state that torque of the first intermediate output pathway in the first planetary gear set is input through the first intermediate input pathway of the second planetary gear set, torque of the second intermediate output pathway in the first planetary gear set is input through the second intermediate input pathway of the second planetary gear set and the fourth forward speed is output through the second ring gear.

9. The power train of claim 1, wherein, in a state that torque of the first intermediate output pathway in the first planetary gear set is input through the first intermediate input pathway of the second planetary gear set, torque of the input shaft is input through the variable input pathway and the fourth forward speed is output through the second ring gear.

10. The power train of claim 1, wherein, in a state that torque of the first intermediate output pathway in the first planetary gear set is input through the first intermediate input pathway of the second planetary gear set, torque of the input shaft is input through the variable input pathway and the fifth forward speed is output through the second ring gear.

11. The power train of claim 1, wherein, in a state that torque of the second intermediate output pathway in the first planetary gear set is input through the second intermediate input pathway of the second planetary gear set, torque of the input shaft is input through the variable input pathway and the sixth forward speed is output through the second ring gear.

12. The power train of claim 1, wherein, in a state that torque of the first intermediate output pathway in the first planetary gear set is input through the second intermediate input pathway of the second planetary gear set, torque of the input shaft is input through the variable input pathway and the seventh forward speed is output through the second ring gear.

13. The power train of claim 1, wherein, in a state that torque of the input shaft is input through the variable input pathway of the second planetary gear set, the second sun gear and the third planet carrier are operated as the fixed member and the eighth forward speed is output through the second ring gear.

14. The power train of claim 1, wherein, in a state that torque of the first intermediate output pathway in the first planetary gear set is input through the second intermediate input pathway of the second planetary gear set, the second planet carrier and the third ring gear are operated as the fixed member and the reverse speed is output through the second ring gear.

* * * * *